Aug. 29, 1939. V. W. KLIESRATH 2,170,905
CLUTCH CONTROL
Original Filed Nov. 30, 1932 2 Sheets-Sheet 1
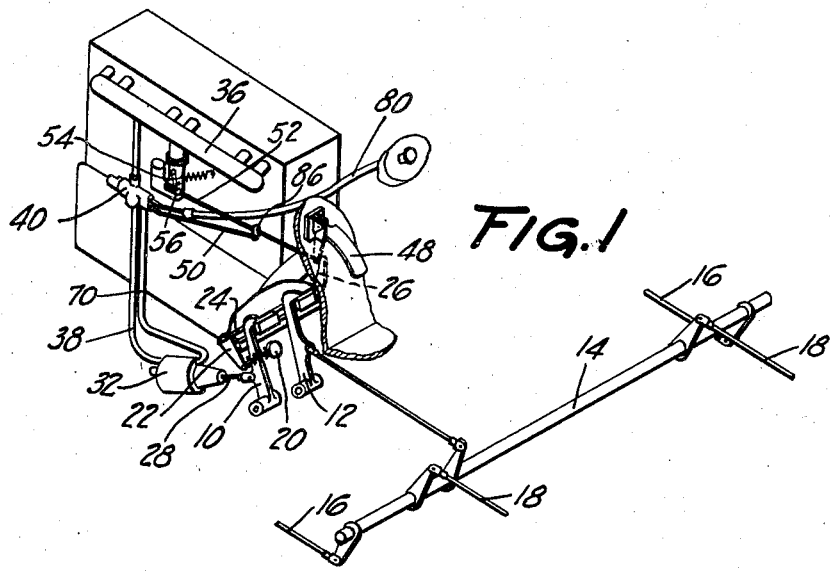
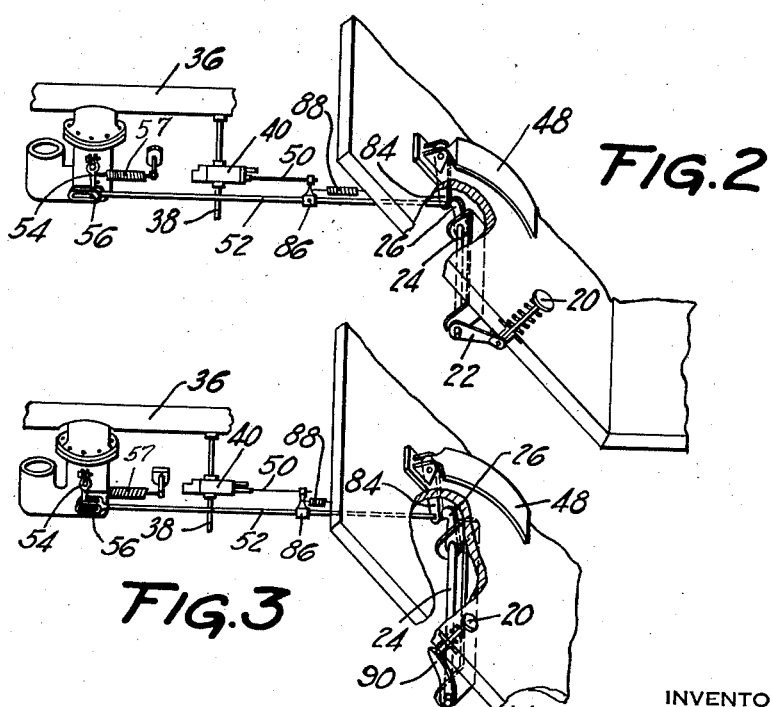
INVENTOR
VICTOR W. KLIESRATH
BY
ATTORNEY Aug. 29, 1939.   V. W. KLIESRATH   2,170,905
CLUTCH CONTROL
Original Filed Nov. 30, 1932   2 Sheets-Sheet 2

INVENTOR
VICTOR W. KLIESRATH
BY
ATTORNEY

Patented Aug. 29, 1939

2,170,905

UNITED STATES PATENT OFFICE 2,170,905

CLUTCH CONTROL

Victor W. Kliesrath, South Bend, Ind., assignor to Bendix Aviation Corporation, South Bend, Ind., a corporation of Delaware Original application November 30, 1932, Serial No. 645,103. Divided and this application April 17, 1937, Serial No. 137,416

1 Claim. (Cl. 192—.01)

This invention relates in general to mechanism for operating the speed controls of an automotive vehicle, and in particular to means for facilitating the operation of said controls to the end that both a minimum of skill and a minimum of physical effort is necessary in the operation of said controls.

It is accordingly an object of the invention to provide power means for operating the clutch, said power means to be controlled by manually operable pedals conveniently located adjacent the conventional brake and clutch pedals in the driving compartment of the vehicle. In a preferred embodiment, I use a miniature pedal or floor button for, in part, controlling the power clutch operating means, said pedal being placed immediately to the left of the conventional clutch pedal and to be operated by the left foot of the driver. Cooperating with such a clutch operating pedal there is provided a conventional accelerator pedal operable by the right foot of the driver, the same to control both the engine throttle and power means for operating the clutch. There are thus provided two pedals, placed to the right and left of the conventional brake and clutch pedals and operable with a minimum of physical effort to control two of the major controls of the vehicle, namely, the throttle and clutch. The conventional clutch pedal is preferably left intact in the driving compartment and is, of course, available in an emergency to operate the clutch, should the power means fail.

More specifically stated, the invention contemplates the provision of manually operable pedal means for selectively controlling the power means for operating the clutch, and to this end there is provided a supplemental pedal or button, operable by the left foot of the driver and operative as a stop to either cut in or cut out the accelerator pedal operation of the power means.

It is the primary object of the invention, however, to provide power means for operating the clutch, including means operable preferably, though not necessarily, by a depression of the left foot of the driver, to effect an operation of the clutch.

Other objects of the invention and desirable details of construction will become apparent from the detailed description of the preferred embodiments of the invention described in the specification to follow and disclosed in the accompanying drawings, in which:

Figure 1 is a diagrammatic view of the several speed controlling mechanism constituting the present invention;

Figure 2 discloses one form of manually operable means for controlling the throttle and power means for operating the clutch;

Figure 3 discloses a modified form of the control means of Figure 2;

Figure 4:
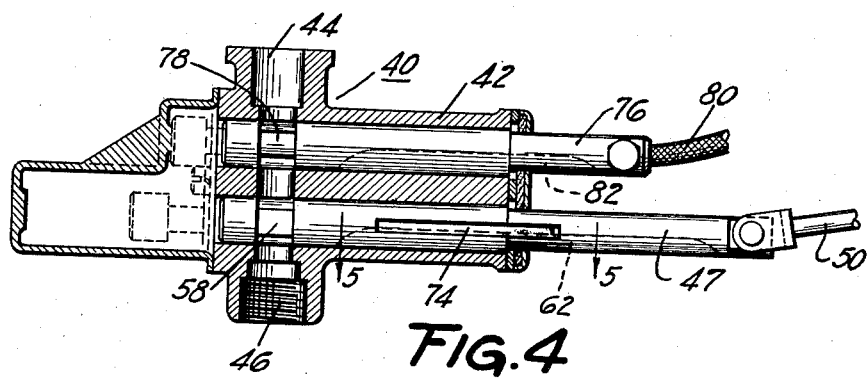
Figure 4 is a longitudinal sectional view of the three-way control valve structure of the clutch vacuum operated power means.

There is disclosed in Figure 1 of the drawings a diagrammatic view of the arrangement of the several speed controlling mechanisms constituting the invention wherein there is provided conventional clutch and brake pedals 10 and 12, the latter being connected to the usual cross shaft 14 operably connected to front and rear brake mechanisms, not shown, by links 16 and 18.

A particular feature of the invention resides in the arrangement of the control means for operating the clutch of the vehicle by power with respect to the conventional brake and clutch pedals, and to this end there is provided a miniature power controlling clutch operating pedal 20, operably connected by a link 22, shaft 24 and link 26 to the throttle operating mechanism, to be described hereinafter.

Figure 6:
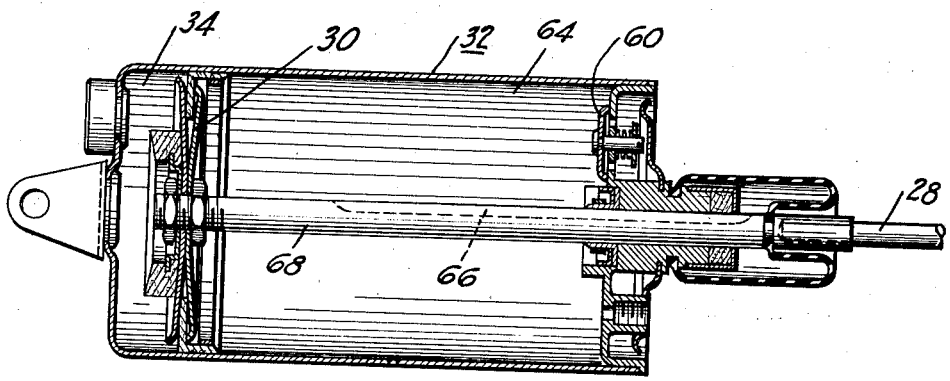
Figure 6 is a longitudinal sectional view of the clutch operating power actuator.

To the clutch pedal 10 there is secured a connecting rod 28 of a reciprocable piston 30 of a vacuum operated power actuator 32, disclosed in detail in Figure 6. The actuator is adapted to be energized or evacuated to disengage the clutch by evacuating a left compartment 34 thereof, the latter being in fluid transmitting communication with the intake manifold 36 of the internal-combustion engine by means of a conduit 38. A three-way control valve 40, disclosed in detail in Figure 4, is interposed in the conduit 38 and serves to alternately place the left compartment 34 of the actuator in communication with the manifold and with the atmosphere to energize and deenergize the actuator to effect the disengagement and engagement of the clutch. The control valve preferably comprises a casing member 42, provided with manifold and actuator ports 44 and 46, respectively, and further comprises a reciprocable valve plunger member 47 operably connected to an accelerator pedal 48 by means of a link 50, the latter connected to a throttle link 52. The link 52 is preferably connected to a throttle valve 54 by means of a lost motion connection 56, the valve being returned to its closed position by a spring 57. Such a construction provides for an operation of the control valve 40 before the throttle is opened and after the same is closed.

The valve piston 47 is provided with a reduced portion 58 to intercommunicate the manifold with the actuator when the accelerator pedal is in its fully retracted position and the pedal 20 is depressed. With the valve in this position, the clutch is disengaged when the engine is idling to create a vacuum in the manifold. Air is evacuated from the compartment 34 and atmosphere is admitted, via a check valve 60, to move the piston 30 to the left to disengage the clutch.

Figure 5:
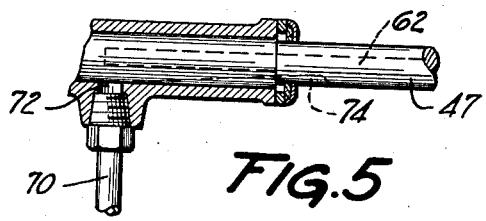
Figure 5 is a fragmentary sectional view of the clutch valve means, the section being taken on line 5—5 of Figure 4.

When it is desired to reengage the clutch, the pedal 20 is released and the accelerator depressed, thereby placing an atmospheric slot 62 in the valve piston in communication with the actuator port 46 of the valve to vent the actuator to atmosphere and effect an engagement of the clutch. This engagement is accomplished in two distinct stages of movement of the actuator piston 30, the first stage, to bring the clutch plates into engagement, being relatively rapid due to the efflux of air from a right compartment 64 of the actuator via a slot 66 in the piston rod 68. When the slot 66 is covered by the end wall of the actuator, the second or clutch plate contacting stage of movement of the clutch pedal is initiated, this movement being controlled by the rate of efflux of air via a bleed conduit 70 terminating in a controlled port 72, the rate of efflux of air via said port 72 being determined by the depth of a slot 74, Figure 5, in the plunger 47. Thus the position of the accelerator pedal determines the rate of movement of the clutch pedal during the aforementioned second or clutch plate contacting stage of movement. A cut-out valve is provided to render the power mechanism inoperative, the same comprising a piston member 76 provided with a recessed portion 78 to intercommunicate the manifold and actuator and also operable, when the piston 76 is moved to the left, preferably by means of a Bowden control 80 operable from the dash, to place an atmospheric slot 82 in the plunger in communication with the actuator via actuator port 46 and conduit 38. Thus, when the operator desires to render the power mechanism for operating the clutch inoperative, he moves the piston 76 to the left to permanently vent the clutch actuator.

From the above-described mechanism, it will be observed that the clutch is operated by vacuum operated power means, the clutch being disengaged by power with release of the accelerator pedal and depression of the pedal or button 20 and reengaged with depression of the accelerator pedal and release of the pedal 20. The two pedals 20 and 48 accordingly provide means operable by the left and right feet of the driver respectively, the same being conveniently positioned to the left and right of the conventional clutch and brake pedals 10 and 12, said pedals 20 and 48 completely controlling, with a minimum of physical effort on the part of the operator, the clutch and throttle of the vehicle. Should the power mechanism for the clutch be rendered inoperative for any reason, the conventional clutch pedal may be operated in the usual manner.

The foot operated pedal 48, cooperating with the throttle operating means, is disclosed in detail in Figure 2. This structure preferably comprises the crank 84 operably connected by interconnected links 22 and 26 and shaft 24 to a spring operated pedal member 20. The accelerator pedal 48 is connected to the valve 40 and a spring operated throttle lever 54 by linkage 50 and 86, said linkage being urged to the right, to permit a closing of the throttle and to operate the valve 40, by a spring 88. In the off position of the parts, the spring returned pedal 20 serves to operate the crank 26 to limit the throw of the throttle and valve operating link members 50 and 86, so that the throttle 54 is closed, under the action of its spring, without, however, operating the valve 40 to effect a disengagement of the clutch. When it is desired to effect a clutch disengaging operation of the valve 40, the driver depresses the pedal 20 with his left foot, thus permitting the accelerator 48 to be completely released under the action of the spring 88 to operate the valve 40. The stop mechanism thus operates as a means to "cut in" the operation of the clutch control valve.

In Figure 3, the mechanism of Figure 2 is adjusted to function as a "cut-out" means whereby with depression of the pedal 20 by the left foot of the driver the parts assume the position of the parts in Figure 2, and the operation of the control valve 40 by the throttle linkage 50 and 86 to effect a disengagement of the clutch is obviated. In order to obtain this result, the crank 90 is positioned to be rotated counterclockwise as distinguished from the clockwise rotation of the same in the arrangement of Figure 2, and in the off position of the parts the valve 40 is operated by the return spring 88 to effect the disengagement of the clutch.

The invention heretofore described is disclosed in my copending application Serial No. 645,103 filed November 30, 1932, this application constituting a division thereof.

Although this invention has been described in connection with certain specific embodiments, the principles involved are susceptible of numerous other applications that will readily occur to persons skilled in the art. The invention is, therefore, to be limited only as indicated by the scope of the appended claim.

I claim:

In an automotive vehicle provided with a clutch, a throttle and an accelerator, linkage interconnecting the throttle and accelerator, power means for operating the clutch including a motor and a valve for controlling the operation of said motor, a foot operated member mounted in the floor board of the driver's compartment, and valve controlling means actuated by said member, for rendering said control valve inoperative to control the clutch engaging and disengaging operations of said motor, said means including a spring normally biasing said foot operated member to a position to render said control valve inoperative, the parts being so constructed and arranged that upon depressing said foot operated member, said valve controlling means is actuated to then make possible an operation of the valve by the accelerator to control the operation of said motor.

VICTOR W. KLIESRATH.